United States Patent [19]
Geiser

[11] 3,888,690
[45] June 10, 1975

[54] MOLD-RELEASE MATERIAL
[75] Inventor: Edward M. Geiser, Downers Grove, Ill.
[73] Assignee: Universal Oil Products Company, Des Plaines, Ill.
[22] Filed: Nov. 9, 1973
[21] Appl. No.: 414,547

[52] U.S. Cl. ............................ 106/38.24; 106/38.22
[51] Int. Cl. ........................................... C04b 35/68
[58] Field of Search............ 106/38.22, 38.24, 38.7, 106/267; 264/338; 117/5.2

[56] References Cited
UNITED STATES PATENTS
3,401,735  9/1968  Parsall .......................... 164/40

FOREIGN PATENTS OR APPLICATIONS
1,201,229  9/1965  Germany ......................... 106/38.24
572,142  3/1959  Canada ........................... 106/38.24

Primary Examiner—Donald E. Czaja
Assistant Examiner—S. M. Person
Attorney, Agent, or Firm—James R. Hoatson, Jr.; Raymond H. Nelson; William H. Page, II

[57] ABSTRACT

Disclosure of a mold-release material which comprises a salt formed from the reaction of an amine and a dimer acid, a paraffinic oil and an organic solvent.

4 Claims, No Drawings

MOLD-RELEASE MATERIAL

This application relates to a novel mold-release material. More specifically, this application relates to a novel mold-release material which comprises a paraffinic oil, a salt formed with the reaction of an amine and a dimer acid, and an organic solvent.

It has now been discovered that a novel mold-release material may be prepared from the mixture of a paraffinic oil, a salt formed from the reaction of an amine and a dimer acid, and an organic solvent. The manufacturer of the mold-release materials will be allowed a greater variety of parameters in determining weight percentages as a result of the greater number of components within the mold-release material. The users of the mold-release material will be benefited as a result of the use of said material as a concrete mold release agent concerning the removal of wooden or metallic molds whereby said molds are more consistently removed with ease and a decrease in manpower in comparision to other materials.

The decrease in manpower in construction work and the decrease in manpower of hand-cleaning the concrete, wooden, or metallic molds to remove adhered cured cement from the surfaces, will permit faster construction at less cost than other construction procedures in which the mold-release material has not been utilized.

The desired product of this invention, namely the novel mold-release material, is utilized in the chemical industry. For example, the novel mold-release material may be used as a concrete mold release agent on metallic or wooden concrete molds.

It is therefore an object of this invention to provide a novel mold-release material.

A further object of this invention is to provide a mold-release material for utilization as a concrete mold release agent in concrete construction work.

In one aspect an embodiment of this invention resides in a mold-release material which comprises a paraffarinic oil, a salt formed from the reaction of an amine and a dimer acid, and an organic solvent.

A second aspect an embodiment of this invention resides in a mold-release material which comprises a salt formed from the reaction of an amine, a dimer acid, and an alkyl acid phosphate, and an organic solvent.

A specific embodiment of this invention resides in a mold-release material comprising 55.0 percent of a paraffinic oil possessing a viscosity of 100 Saybolt Universal Seconds at 100°F, 5.0 percent of a salt formed from reaction of 1.0 equivalents of oleyl amine and 1.0 equivalents of malonic acid, and 40.0 percent of a coal tar naphtha possessing a boiling point of about 320°F.

Another specific embodiment of this invention resides in a mold-release material which comprises 53.5 percent of paraffinic oil possessing a viscosity of 100 Saybolt Universal Seconds at 100°F., 5.5 percent of a salt formed from the reaction of 2.0 equivalents of N-tallow trimethylenediamine, 1.0 equivalents of malonic acid and 1.0 equivalents of mono-diisooctyl acid ortho-phosphate, and 41.0 percent of a coal tar naphtha possessing a boiling point of about 320°F.

Other objects and embodiments will be found in the following further detailed description of the present invention.

As hereinbefore set forth, the present invention is concerned with a mold-release material which comprises a paraffinic oil, a salt formed from reaction of an amine and a dimer acid, and an organic solvent. It is also contemplated within the scope of this invention that the mold-release material may comprise a paraffinic oil, a salt formed from the reaction of an amine, a dimer acid and an alkyl acid phosphate, and an organic solvent. The mold-release material may be prepared by a mixture of requisite portions of the components of the mold-release material hereinafter set forth. The mold-release material comprises a salt formed by the reaction of an amine and a dimer acid. The term "amine" may as used in the specification and appended claims to mean both monoamines and diamines. In a preferred embodiment of the above cited disclosure the salt may also be formed using alkyl acid phosphate in conjunction with the amine and the dimer acid. The salt may be present in the mold-release material in a weight percentage of about 1.0 to 10.0 percent. The components of the salt may be present in ratio of from about 0.5 to about 2.0 equivalents of the amine per 0.5 to about 4.0 equivalents of the dimer acid, and when the alkyl acid phosphate is desired, about 2 equivalents of the long chain amine per 0.5 to about 1.5 equivalents of dimer acid and 0.5 to about 1.5 equivalents of the alkyl acid phosphate.

The mold-release material also contains a peraffinic oil, said paraffinic oil being present in a weight percent of from about 50.0 to about 90.0 percent and an inert organic solvent, said organic solvent being present in a weight percentage of from about 20.0 to about 40.0 percent.

The term "amine" as hereinbefore defined includes both the monoamines and diamines as components of the mold-release material, which would be exemplified by the amyl amine, hexyl amine, heptyl amine, octyl amine, nonyl amine, decyl amine, undecyl amine, lauryl amine, tridecyl amine, myristyl amine, pentadecyl amine, cetyl amine, mono-diisooctyl acid amine, oleyl amine, nonadecyl amine, N-amyl methylenediamine, N-hexyl methylenediamine, N-nonyl dimethylenediamine, N-pentadecyl trimethylenediamine, N-oleyl dimethylenetrimethylenediamine, etc. A dimer acid is also present in conjunction with the amine, said dimer acids being exemplified by all carboxylic acids which possess difunctional carboxylic acid groupings such as oxalic acid, fumaric acid, acetylene dicarboxylic acid, phthalic acid, isophthalic acid, terephthalic acid, malonic acid, etc.

The salt may also be formed from the reaction of an amine, a dimer acid and an alkyl acid phosphate. Suitable examples of alkyl acid phosphates would include mono-diisoamyl acid ortho-phosphate, mono-diisoamyl acid meta-phosphate, mono-diisoamyl acid para-phosphate, mono-diisohexyl acid ortho-phosphate, mono-diisohexyl acid meta-phosphate, mono-diisohexyl acid para-phosphate, mono-diisoheptyl acid ortho-phosphate, mono-diisoheptyl acid meta-phosphate, mono-diisoheptyl acid para-phosphate, mono-diisooctyl acid ortho-phosphate, mono-diisooctyl acid meta-phosphate, mono-diisooctyl acid para-phosphate, mono-diisononyl acid ortho-phosphate, mono-diisononyl acid meta-phosphate, mono-diisononyl acid para-phosphate, mono-diisodecyl acid ortho-phosphate, mono-diisodecyl acid meta-phosphate, mono-diisodecyl acid para-phosphate, etc.

Suitable examples of paraffinic oils which are utilized as one of the components in the mold-release material would include, in particular, all paraffinic oils possessing a viscosity number of about 110 to about 90 Saybolt Universal Seconds at a temperature of 100°F as determined by ASTM test No. D-88.

Suitable examples of inert organic solvents would include N-pentane, n-hexane, n-heptane, benzene, toluene, cumene, naphthalene, naphtha solvents, napththa coal tar solvents, etc.

It is understood that the aforementioned amines, dimer acids, paraffinic oils, organic solvents and alky acid phosphates are only representative of the class of compounds which may be employed, and that the present invention is not necessarily limited thereto.

It is comtemplated within the scope of this invention that the mold-release material may be prepared in either a batch type operation or a continuous type operation. When the continuous operation of manufacturing is performed the resultant mold-release mixture composition may be varied so that different mold-release properties become more salient than others by the change in composition of the component materials, said change in composition may be made during continuous operation by the requisite changes in the stream flows of the component materials.

The following examples are given to illustrate the process of the present invention which, however, are not intended to limit the generally broad scope of the present invention in strict accordance therewith.

EXAMPLE I

In this example a mold-release material is prepared by producing a mixture comprising 55.0 percent by weight of a paraffinic oil possessing a viscosity of 100 Saybolt Universal Seconds at 100°F, as measured by ASTM test No. D-88, 5.0 percent by weight of a salt formed from the reaction of 1.0 equivalents of oleyl amine and 1.0 equivalents of malonic acid, and 40.0 percent by weight of a coal tar naphtha possessing a boiling point of about 320°F. The resultant mold-release material is subsequently applied to a wooden mold wherein unhardened concrete is subsequently poured, said wooden mold having the shape of a rectangle. After a period of time sufficient for the concrete to harden, the wooden mold is removed from the sides of the resultant hardened concrete, said wooden mold is found to be easily removable and having no adhered cured cement on the surface of said wooden form.

EXAMPLE II

In this example a mold-release material is prepared by producing a mixture comprising 53.5 percent by weight of a paraffinic oil possessing a viscosity of 100 Saybolt Universal Seconds at 100°F, as measured by ASTM test No. D-88, 5.5 percent by weight of compound formed from the reaction of 2.0 equivalents of N-tallow trimethylenediamine, 1.0 equivalents of mono-diisooctyl ortho-phosphate and 1.0 equivalents of malonic acid, and 41.0 percent by weight of a coal tar naphtha possessing a boiling point of about 320°F. The resultant mold-release material is subsequently applied to a metal mold wherein unhardened concrete is subsequently poured, said metal mold having the shape of a circle. After a period of time sufficient for the concrete to harden, the metal mold is removed from contact with the resultant hardened concrete, said metal mold is found to be easily removable having no adhered cured cement on the surface of said metal mold.

I claim as my invention:

1. A mold-release composition comprising from about 50% to about 90% of a paraffinic oil, from about 20% to about 40% of an organic solvent, and from about 0.1% to about 10.0% of a salt of an amine, a dicarboxylic acid in a ratio of about 0.5 to about 2.0 equivalents of amine per 0.5 to about 4.0 equivalents of the acid, and about 0.5 to about 1.5 equivalents of an alkyl acid phosphate per 0.5 to about 1.5 equivalents of the acid and about 2.0 equivalents of the amine.

2. The mold-release composition of claim 1 further characterized in that the organic solvent is a coal tar naphtha.

3. The mold-release composition of claim 1 further characterized in that the paraffinic oil possesses a viscosity of 100 Saybolt Universal Seconds at 100°F, the amine is oleyl amine and the acid is malonic acid, and the solvent is a coal tar naphtha with a boiling point at 320°F.

4. The mold-release composition of claim 1 further characterized in that the alkyl acid phosphate is mono-diisooctyl acid ortho-phosphate.

* * * * *